(12) United States Patent
Kasonde et al.

(10) Patent No.: US 9,296,073 B2
(45) Date of Patent: Mar. 29, 2016

(54) METHOD OF MAKING A BIT FOR A ROTARY DRILL

(75) Inventors: Maweja Kasonde, Springs (ZA); John James Barry, County Clare (IE)

(73) Assignees: Element Six Abrasives S.A., Luxembourg (LU); Element Six Limited, County Clare (IE)

( * ) Notice: Subject to any disclaimer, the term of this patent is extended or adjusted under 35 U.S.C. 154(b) by 0 days.

(21) Appl. No.: 13/988,810

(22) PCT Filed: Dec. 9, 2011

(86) PCT No.: PCT/EP2011/072293
§ 371 (c)(1),
(2), (4) Date: Jun. 10, 2013

(87) PCT Pub. No.: WO2012/076678
PCT Pub. Date: Jun. 14, 2012

(65) Prior Publication Data
US 2014/0026716 A1    Jan. 30, 2014

Related U.S. Application Data

(60) Provisional application No. 61/421,874, filed on Dec. 10, 2010.

(30) Foreign Application Priority Data

Dec. 10, 2010   (GB) .................................. 1020967.4

(51) Int. Cl.
*B23P 15/32*    (2006.01)
(52) U.S. Cl.
CPC ...................................... *B23P 15/32* (2013.01)

(58) Field of Classification Search
CPC ........................................................ B23P 15/32
USPC .................................. 76/108.1, 108.2, 108.6
See application file for complete search history.

(56) References Cited

U.S. PATENT DOCUMENTS

| 544,337 | A | | 8/1895 | Williamson |
| 4,527,643 | A | | 7/1985 | Horton et al. |
| 4,604,106 | A | * | 8/1986 | Hall ............................... 51/293 |
| 4,627,503 | A | * | 12/1986 | Horton ...................... 175/420.2 |

(Continued)

FOREIGN PATENT DOCUMENTS

| EP | 0506238 A3 | 2/1992 |
| EP | 0506238 A2 | 9/1992 |

(Continued)

OTHER PUBLICATIONS

Search Report for GB1020967.4 dated Jan. 18, 2011.

(Continued)

*Primary Examiner* — Hwei C Payer
(74) *Attorney, Agent, or Firm* — Armstrong Teasdale LLP

(57) ABSTRACT

A method of manufacturing a bit for a rotary drill, the bit including a drill tip (30), the method including providing a precursor structure (10) comprising substrate body (14) and a super-hard structure (12) joined to an upper surface of the substrate body; cutting a plurality of conformal inserts (20) from the precursor structure (10), each insert (20) comprising a part of the super-hard structure; providing a drill tip (30) configured for receiving the insert (20); and joining the insert to the drill tip (30).

27 Claims, 2 Drawing Sheets

(56) References Cited

U.S. PATENT DOCUMENTS

| | | | |
|---|---|---|---|
| 4,694,710 A * | 9/1987 | Phaal | 76/108.1 |
| 4,762,445 A | 8/1988 | Bunting et al. | |
| 5,195,403 A * | 3/1993 | Sani et al. | 76/108.6 |
| 5,195,404 A * | 3/1993 | Notter et al. | 76/108.6 |
| 5,299,471 A | 4/1994 | Tank et al. | |
| 5,505,272 A * | 4/1996 | Clark | 175/405.1 |
| 5,611,251 A | 3/1997 | Katayama | |
| 5,676,496 A * | 10/1997 | Littecke et al. | 407/118 |
| 6,029,544 A | 2/2000 | Katayama | |
| 6,694,847 B2 * | 2/2004 | Hiroyasu et al. | 76/108.6 |
| 6,696,137 B2 * | 2/2004 | Yong | 428/175 |
| 6,779,951 B1 | 8/2004 | Vale et al. | |
| 7,179,023 B2 * | 2/2007 | Goudemond et al. | 407/119 |
| 8,393,938 B2 * | 3/2013 | Sung | 451/443 |
| 2005/0005081 A1 | 1/2005 | Ehama et al. | |
| 2008/0247899 A1 | 10/2008 | Cho et al. | |
| 2011/0176879 A1 * | 7/2011 | Jonker et al. | 408/144 |
| 2013/0047397 A1 * | 2/2013 | Jonker et al. | 29/419.1 |
| 2014/0026716 A1 * | 1/2014 | Kasonde et al. | 76/108.6 |

FOREIGN PATENT DOCUMENTS

| | | | |
|---|---|---|---|
| EP | 0625628 A1 | | 11/1994 |
| GB | 2462025 A | | 1/2010 |
| GB | 2491956 | * | 12/2012 |
| GB | 2486345 | * | 6/2013 |
| JP | 64016330 A1 | | 1/1989 |
| JP | 2001300807 A1 | | 10/2001 |

OTHER PUBLICATIONS

Search Report for GB1121091.1 dated Jan. 25, 2012.
International Search Report for PCT/EP2011/072293 dated Feb. 2, 2012.
Ex Parte Paul, PTAB Decision on Appeal No. 2011-006827 for U.S. Appl. No. 11/172,547 dated Mar. 11, 2013.

* cited by examiner

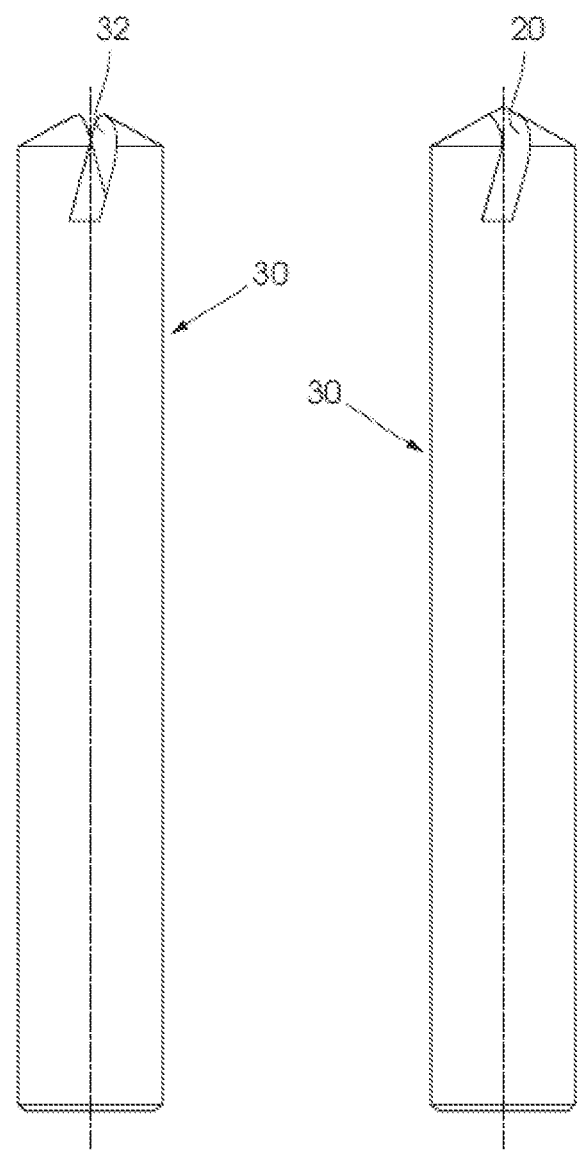

METHOD OF MAKING A BIT FOR A ROTARY DRILL

This disclosure relates generally to a method of making a bit for a rotary drill, more particularly but not exclusively for a twist drill comprising a super-hard drill tip.

A twist drill can be described generally as a rotary end cutting tool having one of more cutting faces or lips, and also one or more helical or straight flutes for conveying the chip from a hole being drilled. Twist drills my be used for drilling holes in metal, plastic, wood and masonry and are manufactured from a variety of materials such as low carbon steel, high carbon steel, high speed steel and cobalt steel. If better wear resistance is required, tipped tools may be used, in which the drill may include tungsten carbide or super-hard points that are secured to the drill body.

United Kingdom patent application publication number GB 2462025 discloses a method of making helical shaped solid PCD and PCBN tip that can be attached to the conventional tool substrates such as twist drills, drills, and end mills. The method may include making a contoured solid polycrystalline super-abrasive material by providing an electrically conductive polycrystalline super-abrasive blank. The polycrystalline super-abrasive blank can be wire electro-discharge machined to form a contoured solid polycrystalline super-abrasive material having a predetermined shape. Drill tip segments can be cut from a solid blank by curved slicing of a PCD blank.

There is a need for efficient methods of manufacturing super-hard tips for rotary machine tools.

Viewed from one aspect there is provided a method of manufacturing a bit for a rotary drill, the bit including a drill tip, the method including providing a precursor structure comprising a substrate body and a super-hard structure joined to an upper surface of the substrate body; cutting a plurality of substantially conformal inserts from the precursor structure, each insert comprising a part of the super-hard structure; providing a drill tip configured for receiving the insert; and joining the insert to the drill tip. The precursor structure will be configured to be capable of being cut into more than one substantially conformal insert for a drill tip. As used herein, substantially conformal inserts comprise respective super-hard structures having substantially the same shape but not necessarily the same size (although in some versions of the method, the inserts may have substantially the same size).

Various arrangements and combinations are envisaged by the disclosure, of which non-limiting and no-exhaustive examples are as follows.

The super-hard structure may be in the form of a layer.

The plurality of inserts may be configured to have substantially conformal (for example parallel) side surfaces extending between the upper surface of the substrate body and a bottom surface of the substrate body generally opposite the upper surface. The side surfaces of the substrate body may be curved, for example helically or partially helically curved. The side surfaces may be substantially perpendicular to the respective bottom surfaces. The upper surface (to which the super-hard structure is attached) may include at least two non-parallel regions configured, for example angled, to be suitable for a desired point geometry of the drill. The upper surface may include a plurality of substantially planar regions and or one or more curved surface regions.

The method may include processing the inserts such as by grinding, in which the processing will not substantially alter the shape or size of the inserts. In some versions of the method, the processing may modify dimensions and or surface finish of the inserts by at most about 500 microns, at most about 100 microns or at most about 20 microns. In some arrangements, each insert may comprise a respective super-hard structure joined to an insert body and in some examples the insert bodies may also have substantially the same size and shape. Some versions of the method may include processing or treating the insert prior to the insert being joined to the drill tip, and some versions may include joining the insert to the drill tip and then processing exposed parts of the insert. Processing the insert after joining it to the drill tip is likely to have the aspect that greater accuracy of finished dimensions can be achieved, and in some examples the insert may be processed to within a tolerance of about 5 microns.

In some example arrangements the inserts may be cooperatively nested or nestable, one within or against another.

In some example arrangements, the inserts may be substantially the same size, any differences in shape or dimensions of the super-hard structures being sufficiently small that they can be processed or otherwise treated to form finished inserts, the processing or treatment modifying the shape and or dimensions of the super-hard structure by at most about 500 microns, at most about 100 microns or at most about 20 microns.

In some versions of the method, the precursor structure may be generally prismoidal, and may have a pair of substantially parallel opposite ends connected by substantially rectangular sides. The precursor structure may have an upper surface defining a central apex extending between opposite ends of the precursor body. The drill tip may be provided with a point angle, and the apex of the precursor body may form an included angle substantially equal to the point angle.

In some versions of the method, the included angle may be at least about 110 degrees and at most about 125 degrees, and in one version, the included angle may be about 118 degrees.

In some versions of the method, the insert viewed from a side surface may have substantially the same shape as the precursor structure when viewed from an end.

In some versions of the method, the substrate body of the precursor structure may comprise cobalt-cemented tungsten carbide (WC).

In some versions of the method, the super-hard layer may be polycrystalline diamond (PCD) material or polycrystalline cubic boron nitride (PCBN) material.

The method may include joining the cemented carbide substrate via at least three intermediate layers disposed between the super-hard layer and the substrate body, the intermediate layers comprising different compositions of super-hard grains, metal carbide grains and metal binder.

In some versions of the method, each intermediate layer may be at least about 0.1 mm or at least about 0.2 mm thick. In some embodiments, each intermediate layer may be at most about 0.2 mm or at most about 0.3 mm thick.

In some versions of the method, the precursor structure may comprise a PCD layer integrally joined to a cobalt-cemented tungsten carbide substrate via at least one intermediate layer comprising grains of diamond and grains of WC dispersed within a binder comprising Co.

In some versions of the method, the thickness of the super-hard structure may be substantially uniform, and in some versions, the thickness of the super-hard structure may be non-uniform.

In some versions of the method, at least part of the super-hard structure may be at least about 0.4 mm or at least about 0.6 mm in thickness. In some versions, at least part of the super-hard structure is at most about 3 mm or at most about 6 mm in thickness.

Cutting an insert from the precursor structure may include cutting an insert having non-planar or curved sides.

The method may include providing a drill tip adapted for receiving the insert to include forming a slot in the drill tip, which slot is complementary to the profile of the insert.

The drill may be for an industrial machine tool, for drilling into materials such as ceramic material, polymer, fibre-reinforced polymers, wood-containing material, composite material, material comprising metal or metal alloys or super-alloys. The drill may be a twist drill.

Non-limiting embodiments will now be described with reference to the accompanying drawings in which:

FIG. 6 shows a schematic side view of an example drill tip for use in manufacturing the bit, the drill bit having been prepared to receive the insert; and FIG. 7 shows a side view of drill tip of FIG. 6 with an example insert having been located in a slot provided in the drill tip.

Figure 1:
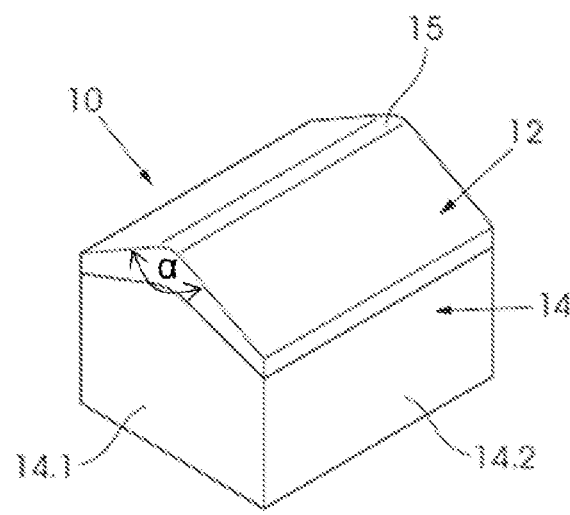
FIG. 1 shows a schematic perspective view of an example precursor.
Figures 2, 3:
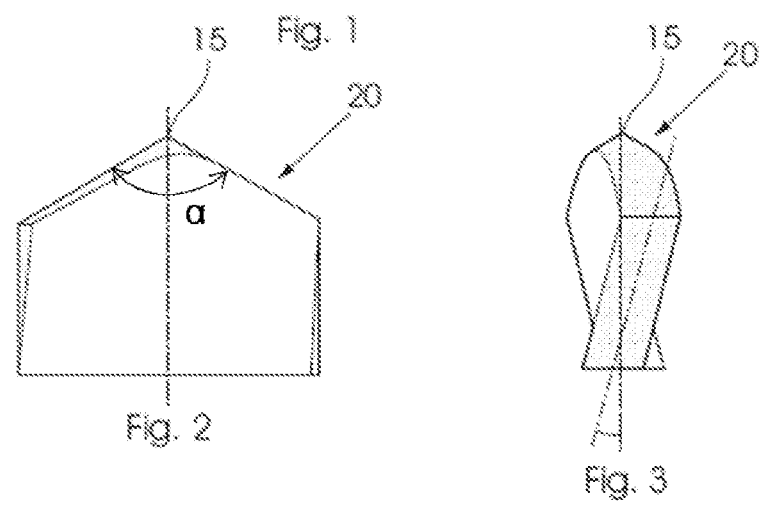
FIG. 2 shows a schematic side view of an example super-hard insert cut from the precursor structure shown in FIG. 1.
FIG. 3 shows an end view of the insert of FIG. 2.
Figures 4, 5:
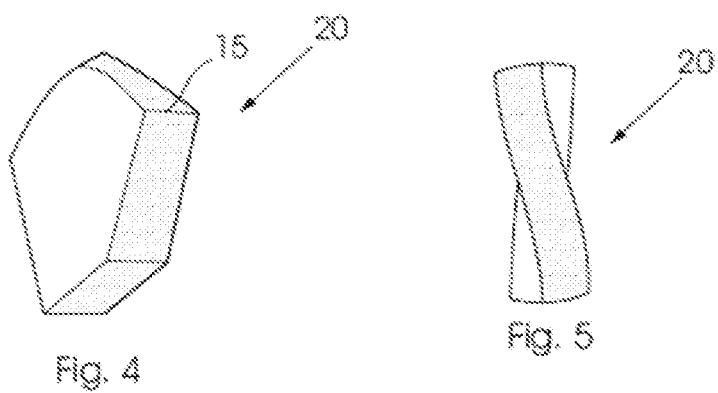
FIG. 4 shows a perspective view of the insert of FIG. 2.
FIG. 5 shows a top plan view of the insert of FIG. 2.

With reference to FIG. 1, an example of a precursor structure 10 comprises a layer 12 of polycrystalline super-hard material (PCD or PCBN) integrally bonded to a cemented carbide substrate 14 and has a generally prismoidal shape having a pair of substantially parallel opposite ends 14.1 connected by substantially rectangular sides 14.2. The layer 12 has a projecting surface having an elongate central rounded apex 15 extending between the ends and defining an included angle α.

As an example, a PCD precursor structure 10 may be made using a method including:

i. providing a cemented carbide substrate having a generally prismoid shape and a surface that has a generally projecting shape, the substrate comprising a binder material that is a catalyst material for diamond, such as Co;

ii. disposing an aggregated mass of diamond grains in layer form onto the projecting surface of the substrate to form a pre-sinter assembly;

iii. encapsulating the pre-sinter assembly within a jacket of refractory metal or ceramic material, and assembling the encapsulated pre-sinter assembly into a capsule for an ultra-high pressure furnace (also called an ultra-high pressure press) and subjecting it to a pressure of at least about 5.5 GPa and a temperature of at least about 1,300 degrees centigrade to produce a PCD layer integrally bonded to the substrate.

An example of a method for making a layered PCD construction includes providing tape cast sheets, each sheet comprising a plurality of diamond grains bonded together by a binder, such as a water-based organic binder, and stacking the sheets on top of one another and on top of a support body. Different sheets comprising diamond grains having different size distributions, diamond content and additives may be selectively stacked to achieve a desired structure. The sheets may be made by a method known in the art, such as extrusion or tape casting methods, wherein slurry comprising diamond grains and a binder material is laid onto a surface and allowed to dry. Other methods for making diamond-bearing sheets may also be used, such as described in U.S. Pat. Nos. 5,766,394 and 6,446,740 may be used. Alternative methods for depositing diamond-bearing layers include spraying methods, such as thermal spraying.

In some examples, the substrate body may be formed of cobalt cemented tungsten carbide comprising about 10 weight percent Co, and WC grains having a mean size in the range from about 4 microns to about 6 microns.

Once the precursor structure has been formed, for example as described above, a suitable insert can be cut from the precursor body. As an example, this may be done using a wire EDM (electro-discharge machining) apparatus, which allows for freedom in terms of cutting an insert having a desired profile from the precursor body.

The segment may be extracted from the sintered precursor structure or blank with two or more upper surfaces composed entirely of PCD, two side surfaces composed of a PCD portion and a carbide portion and a base surface composed entirely of carbide. The blank may be sintered in such dimensions so as to provide for the extraction of multiple segments, thus further improving the economics of the process of drill manufacture.

The insert 20 may take many different forms, and may be a substantially flat body, but may also have curved sides forming a non-planar insert. This may reduce the likelihood of machining of the insert when the drill tip 30 is machined after the insert has been joined thereto.

An example of such a curved insert 20 is shown in FIG. 2 to FIG. 5, and a drill tip 30 having a complementary slot 32 for receiving the insert is shown in FIG. 6. Due to the complementary nature of the slot and the insert, the geometric description of the slot and insert are the same, and what applies to the slot (as discussed below) applies similarly to the insert.

The drill tip may be machined so as to form a slot 32 at one end, the slot 32 having a bottom surface which is rectangular in area when viewed normal to the axis of the shaft. The slot may include two opposing, parallel or near-parallel, helical surfaces which, if extended along a distance equal to about 25% of the length of the shaft, would not intersect. The slot may be of geometry such that the distance between the helical surfaces, measured along a vector normal to both surfaces, is constant across the two helical surfaces of the slot or reduces from the top of slot to the bottom of the slot by an amount no greater than 50% of the maximum distance between the helical surfaces.

As mentioned above, the external surfaces of the segment have geometry identical to the surfaces of the slot formed in the shaft. The segment may thus be positioned in the slot by a combination of translation and rotation so as to form the assembly shown in FIG. 7. During final assembly of both components, a braze paste or foil will be inserted between some or all of the mating surfaces.

The particular geometry of the slot and insert may enhance the reliability of the anchoring of the segment in the slot when the PCD top surfaces are subject to forces in the application of the drill. Furthermore, the helix defining the surfaces of the segment and the slot may be similar to the final helix angle of the twist drill, which may reduce the volume of PCD material to be removed during final machining of the flutes, potentially reducing the cost of PCD drill manufacture.

Certain terms and concepts as used herein are briefly explained below.

Polycrystalline diamond (PCD) and polycrystalline cubic boron nitride (PCBN) are examples of polycrystalline super-hard materials. PCD and PCBN material may be made by sintering grains of diamond and cubic boron nitride (cBN), respectively, at an ultra-high pressure of several GPa. As used herein, a "super-hard material" is a material having a Vickers hardness of at least about 28 GPa. Diamond, cubic boron nitride (cBN), polycrystalline diamond (PCD) and polycrystalline cubic boron nitride (PCBN) material are examples of super-hard materials. As used herein, a "super-hard structure" means a structure comprising a super-hard material.

As used herein, "polycrystalline diamond" (PCD) is a material comprising a plurality of diamond grains, a substantial portion of which are directly inter-bonded with each other and in which the content of diamond is at least about 80 volume percent of the material. In one embodiment of PCD material, interstices between the diamond grains may be at least partly filled with a binder material comprising a catalyst for diamond. As used herein, "interstices" or "interstitial regions" are regions between the diamond grains of PCD material. In embodiments of PCD material, interstices or interstitial regions may be substantially or partially filled with a material other than diamond, or they may be substantially empty. Embodiments of PCD material may comprise at least a region from which catalyst material has been removed from the interstices, leaving interstitial voids between the diamond grains.

As used herein, "polycrystalline cubic boron nitride" (PCBN) material comprises a mass of cBN grains dispersed within a binder material and in which the content of cBN is at least about 50 volume percent of the PCBN material.

As used herein, a "flute" is a recessed portion of a rotary machine tool, such as a twist drill, which is capable of conveying chips away from a cutting edge as the tool rotates in use. A twist drill may comprise two or more flutes, one for each cutting edge. Other rotary machine tools, such as taps, ball-nose end mills and straight end mills, which may sometimes be referred to as slot-drills, may have up to six or more cutting edges and flutes. As used herein, a "helical flute", which may also be known in the art as a "spiral flute", comprises a flute arranged generally and at least partially helically with respect to a rotational axis of a rotary machine tool. As used herein, a bi-directional helical flute configuration comprises flutes having different or opposite helical directions.

As used herein, a "twist drill" is a tipped drill having one or more cutting lips, and having one or more helical or straight flutes for the passage of chips and the admission of a cutting fluid. As used herein, a "point angle" of a twist drill is the angle included between the cutting lips projected upon a plane parallel to the drill axis and parallel to the two cutting lips.

The invention claimed is:

1. A method of manufacturing a bit twist drill for a rotary twist drill, the bit twist drill including a drill tip provided with a point angle, the method including:
   cutting a plurality of conformal inserts from a precursor structure, the precursor structure comprising a substrate body and a super-hard structure joined to an upper surface of the substrate body, the precursor structure having an upper surface defining a central apex extending between opposite ends of the precursor structure, the apex forming an included angle substantially equal to the point angle, each insert comprising a part of the super-hard structure and having non-planar curved side surfaces that are at least partially helical; and
   joining the insert to a drill tip configured to receive the insert.

2. A method as claimed in claim 1, further comprising cutting the plurality of conformal inserts such that the side surfaces of each insert of the plurality of inserts are conformal side surfaces extending between the upper surface of the substrate body and a bottom end of the substrate body opposite the upper surface of the substrate body.

3. A method as claimed in claim 2, further comprising forming the upper surface of the substrate body to include at least two non-parallel regions configured to be suitable for a desired point geometry of the drill.

4. A method as claimed in claim 2, further comprising providing the precursor structure in the form of a prismoidal precursor structure.

5. A method as claimed in claim 1, including processing the inserts.

6. A method as claimed in claim 5, in which processing modifies the dimensions of the inserts by at most about 500 microns.

7. A method as claimed in claim 1, including processing the insert after joining the insert to the drill tip.

8. A method as claimed in claim 7, in which the insert is processed to within a tolerance of about 5 microns.

9. A method as claimed in claim 1, further comprising cutting the plurality of conformal inserts from the precursor structure such that the inserts are cooperatively nestable, one against another.

10. A method as claimed in claim 1, further comprising cutting the plurality of conformal inserts from the precursor structure such that the inserts are the same size.

11. A method as claimed in claim 1, further comprising providing the precursor structure in the form of a prismoidal precursor structure.

12. A method as claimed in claim 1, further comprising providing the included angle to be at least about 110 degrees and at most about 125 degrees.

13. A method as claimed in claim 1, further comprising providing the included angle to be about 118 degrees.

14. A method as claimed in claim 1, in which the insert viewed from at least one of the non-planer curved side surfaces has the same shape as the precursor structure viewed from an end.

15. A method as claimed in claim 1, further comprising forming the super-hard structure from polycrystalline diamond (PCD) material or polycrystalline cubic boron nitride (PCBN) material.

16. A method as claimed in claim 1, further comprising forming the substrate body of the precursor structure from cobalt-cemented tungsten carbide.

17. A method as claimed in claim 16, further comprising forming the super-hard structure from polycrystalline diamond (PCD) material or polycrystalline cubic boron nitride (PCBN) material.

18. A method as claimed in claim 1, further comprising providing the super-hard structure with a substantially uniform thickness.

19. A method as claimed in claim 1, further comprising providing the super-hard structure in the form of a layer and at least part of the layer is at least about 0.4 mm thick.

20. A method of manufacturing a bit twist drill for a rotary twist drill, the bit twist drill including a drill tip provided with a point angle, the method including:
   providing a precursor structure comprising a substrate body and a super-hard structure joined to an upper surface of the substrate body, the precursor structure having an upper surface defining a central apex extending between opposite ends of the precursor structure, the apex forming an included angle substantially equal to the point angle, the super-hard structure comprising polycrystalline diamond (PCD) material or polycrystalline cubic boron nitride (PCBN) material, and the substrate body of the precursor structure comprising cobalt-cemented tungsten carbide;
   the method further including: cutting a plurality of conformal inserts from the precursor structure, each insert comprising a part of the super-hard structure, the plurality of inserts being configured to have conformal, non-planar curved side surfaces that are at least partially helical extending between the upper surface of the substrate body and a bottom end of the substrate body opposite the upper surface of the substrate body;

providing a drill tip configured for receiving an insert, and joining the insert to the drill tip.

21. A method as claimed in claim 20, including processing the inserts such that the dimensions of the inserts are modified by at most about 500 microns.

22. A method as claimed in claim 20, including processing the insert after joining the insert to the drill tip.

23. A method as claimed in claim 22, in which the insert is processed to within a tolerance of about 5 microns.

24. A method as claimed in claim 20, further comprising providing the precursor structure in the form of a prismoidal precursor structure.

25. A method as claimed in claim 20, further comprising providing the precursor structure to have the included angle at least about 110 degrees and at most about 125 degrees.

26. A method as claimed in claim 20, further comprising providing the precursor structure to have the thickness of the super-hard structure substantially uniform.

27. A method as claimed in claim 20, further comprising providing the precursor structure to have the super-hard structure in the form of a layer and at least part of the layer is at least about 0.4 mm thick.

\* \* \* \* \*